United States Patent
Cramer et al.

(10) Patent No.: US 6,945,682 B2
(45) Date of Patent: Sep. 20, 2005

(54) HEADLIGHT FOR MOTOR VEHICLES

(75) Inventors: Herbert Cramer, Ruethen (DE); Hubertus Hering, Werl (DE); Pavel Brostik, Lutin (CZ)

(73) Assignee: Hella KG Hueck & Co., Lippstadt (DE)

( * ) Notice: Subject to any disclaimer, the term of this patent is extended or adjusted under 35 U.S.C. 154(b) by 119 days.

(21) Appl. No.: 10/712,047

(22) Filed: Nov. 14, 2003

(65) Prior Publication Data

US 2004/0151005 A1 Aug. 5, 2004

(30) Foreign Application Priority Data

Nov. 14, 2002 (DE) .......................................... 102 52 983

(51) Int. Cl.⁷ .............................................. F21V 21/14
(52) U.S. Cl. ...................... 362/528; 362/515; 403/132; 403/135
(58) Field of Search ............................... 362/528, 523, 362/549, 515, 427, 421, 530, 372, 289, 226; 403/140–143, 71, 76, 77, 133–135, 119, 122–127; 248/288.31

(56) References Cited

U.S. PATENT DOCUMENTS

| | | | | | |
|---|---|---|---|---|---|
| 3,787,127 A | * | 1/1974 | Cutler | ........................ | 403/133 |
| 4,318,627 A | * | 3/1982 | Morin | ........................ | 403/133 |
| 4,894,754 A | * | 1/1990 | Levilain | | |
| 5,032,965 A | * | 7/1991 | Weber | ........................ | 362/428 |
| 5,564,853 A | * | 10/1996 | Maughan | .................... | 403/137 |
| 5,653,548 A | * | 8/1997 | Amdahl | ...................... | 403/133 |
| 5,904,436 A | * | 5/1999 | Maughan et al. | ........... | 403/140 |
| 6,113,301 A | * | 9/2000 | Burton | ........................ | 403/122 |
| 6,692,176 B1 | * | 2/2004 | Fladhammer | .................. | 403/2 |

FOREIGN PATENT DOCUMENTS

| | | |
|---|---|---|
| DE | 38 41 632 A1 | 6/1989 |
| DE | 198 32 254 A1 | 1/2000 |
| DE | 298 17 229 U1 | 3/2000 |
| DE | 100 51 626 A1 | 5/2001 |
| DE | 101 12 310 A1 | 9/2001 |

* cited by examiner

Primary Examiner—Stephen Husar
Assistant Examiner—Hargobind S. Sawhney
(74) Attorney, Agent, or Firm—Birch, Stewart, Kolasch & Birch, LLP

(57) ABSTRACT

A headlight for motor vehicles is provided that includes an optical element, which is connected to a support element by at least one ball-and-socket joint. The ball-and-socket joint has a spherical ball and a spherical socket. The socket encloses the ball with socket segments and is inserted together with the ball into a receptacle, and contacts, via its socket segments, the inside of the receptacle. The socket contacts the bottom of the receptacle with a base, and has on the other side freestanding elastic socket segments that enclose the ball. Elastic detent elements of the receptacle engage behind the base of the socket and retain the socket axially in the receptacle.

15 Claims, 3 Drawing Sheets

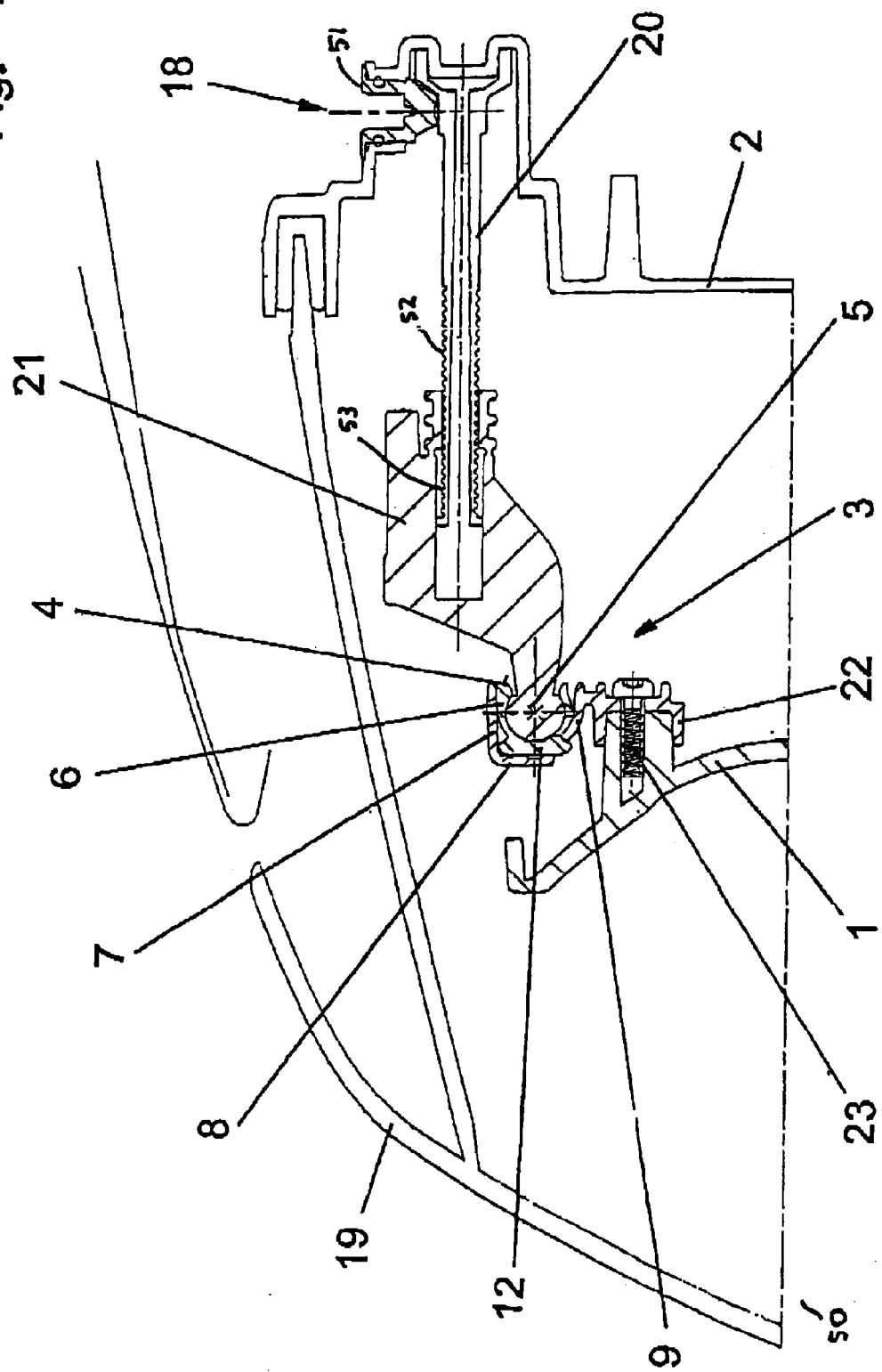

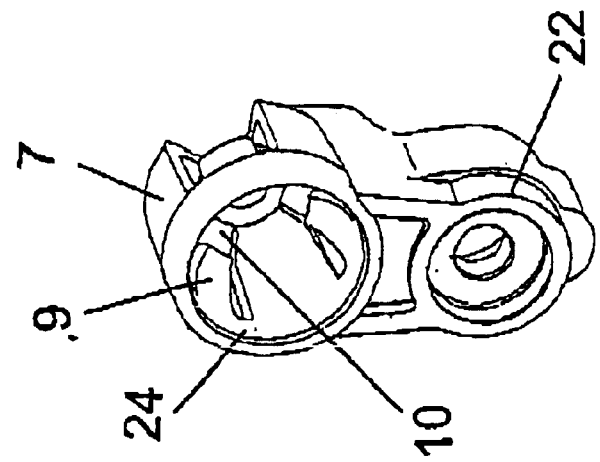
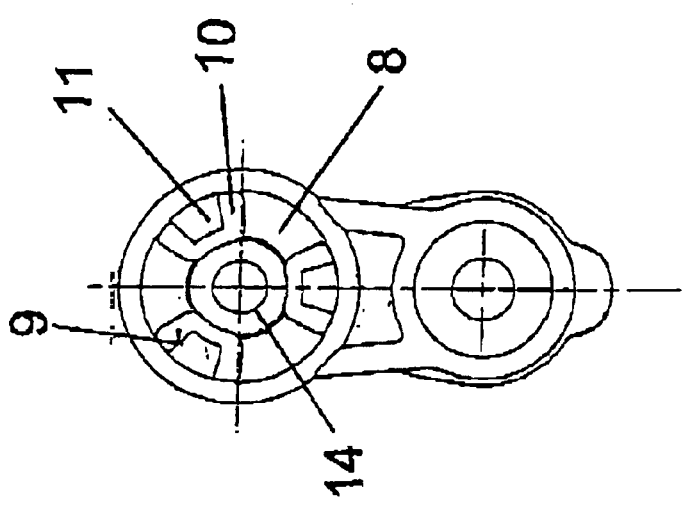
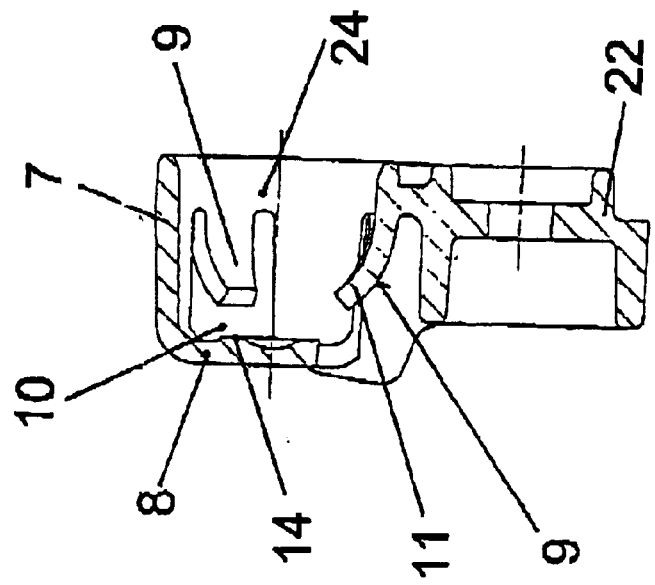

HEADLIGHT FOR MOTOR VEHICLES

This nonprovisional application claims priority under 35 U.S.C. § 119(a) on German Patent Application No. 102 52 983.3 filed in Germany on Nov. 14, 2002, which is herein incorporated by reference.

BACKGROUND OF THE INVENTION

1. Field of the Invention

The present invention relates to a headlight for motor vehicles. The headlight includes an optical element, a support element, at least one ball-and-socket joint that connects the optical element to the support element, and a spherical ball and a spherical socket. The socket encloses the ball with socket segments and is inserted into a receptacle together with the ball and contacts the inside of the receptacle with its socket segments.

2. Description of the Background Art

A headlight for motor vehicles is known from DE-A-38 41 632, whose equivalent is published as U.S. Pat. No. 4,894,754. An optical element of the headlight having a dish-shaped reflector and a lens covering the reflector, is shown. The optical element is joined to a support element by multiple ball-and-socket joints. The ball-and-socket joint is a part of an adjusting device. The adjusting device has an adjusting screw that is retained in an axially adjustable fashion in an opening of the support element. At a free end, facing in the direction of light output, the adjusting screw has a spherical ball. A socket surrounds the ball with socket segments whose free end sections face in the direction of attachment. The socket segments have hinge-like linkages so that they can be joined to the ball.

When the ball-and-socket joint, of the prior art device, is assembled, a section of the socket is inserted into the receptacle and a free section of the socket segments is opened outward about the hinge-like linkages. When the ball enters the socket and the socket is inserted in the receptacle, the free sections of the socket segments fold together about the hinge-like linkages and contact the inside of the receptacle. As a result, the ball is retained in the socket and the socket is inserted together with the ball in a receptacle of the reflector until the locking action. In this process, detent projections engage behind an edge of the receptacle facing in the direction of insertion, and retaining projections of the elastic socket segments that extend radially outward contact the edge of the receptacle facing away from the direction of insertion.

The socket segments of the prior art device, however, must be designed to be suitably sturdy so that the socket can be securely joined to the receptacle. A ball-and-socket joint of this nature is correspondingly large. Furthermore, the socket is not retained securely against loss in its preassembled state in which a section of the socket is inserted in the receptacle.

SUMMARY OF THE INVENTION

It is therefore an object of the present invention to provide an automotive headlight such that elastic socket segments enclosing a ball can be produced with thin walls so that the socket can be easily locked onto the ball, and so that the socket locks securely into a receptacle and has a compact construction. This object is attained in accordance with the invention, in that the socket has a base that contacts the bottom of the receptacle and on its other side has freestanding elastic socket segments that enclose the ball, wherein elastic detent elements of the receptacle engage behind the base of the socket and retain the socket axially in the receptacle.

Prior to joining the ball and the receptacle, the socket is retained on the ball securely from loss. Since the socket segments of the socket do not attach axially to the receptacle, they can be made with walls that are thin so that they can elastically contact the ball and the inside of the receptacle, and thus attach the ball radially without play. Moreover, the ball-and-socket joint has a compact construction.

In this context, it is especially advantageous if the elastic detent elements are comprised of detent tabs; which are each molded on an edge of an opening in a circumferential side wall of the receptacle and point with their free end section to the bottom of the receptacle and radially inward. It is additionally useful here if the elastic detent elements contact a circumferential edge section of the base that is freestanding in the radially outward direction and hold the base against the bottom of the receptacle. The detent connection between the detent elements and the socket cannot separate unintentionally, since it is in a protected location inside the receptacle.

The socket is held axially in the receptacle without play even with coarse tolerances, if the bottom of the receptacle is designed to be elastically resilient in the direction of insertion of the socket. The elasticity of the bottom is achieved through a simple construction of the receptacle when the openings for the detent elements extend from the circumferential side wall of the receptacle to the central region of the bottom. The base of the socket is certain to contact the central region of the bottom of the receptacle if the central region of the bottom of the receptacle has, on the side facing the base, a raised area that serves as a stop for the base.

The receptacle can accommodate a high compressive force in the radial direction with the elastic socket segments of the socket, if the socket, with its edge sections of the socket segments pointing away from the direction of insertion, on the inside of the receptacle, elastically contacts the inside of the receptacle between the openings for the elastic detent elements and the free edge of the receptacle and holds the ball radially in its desired position by the freestanding radially elastic socket segments. It is desirable in this regard for all of the elastic socket segments to have, for example, a projection on each neighboring side of their free edge sections. In this way, the ball and the receptacle, and thus also the optical element, can be connected to the support element in a manner sufficiently stable so that the optical element can be connected to the support element to be vibration-free during driving, even with very thin-walled socket segments.

In an especially advantageous further development of the invention, the base of the socket is a circular disk whose outer edge section has a radius on the circumferential edge facing the bottom of the receptacle. During assembly, the base centers itself on the radially inward projecting detent elements. It is also advantageous for the outer edge section of the circular disk to have a circumferential contact chamfer for the elastic detent elements on the edge facing away from the bottom of the receptacle. In this way, contact of the receptacle's radially elastic detent element with the contact chamfer of the socket is assured even with coarse tolerances.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a cross-section of a portion of an automotive headlight with an optical element and a ball-and-socket joint with a receptacle that accommodates a ball and a socket;

FIG. 2 is a perspective view of the receptacle attached to the optical element as an individual component;

FIG. 3 is a front view of the receptacle from FIG. 2;

FIG. 4 is a longitudinal cross-section through the center of the receptacle from FIG. 2;

DETAILED DESCRIPTION OF THE PREFERRED EMBODIMENTS

Figure 5:
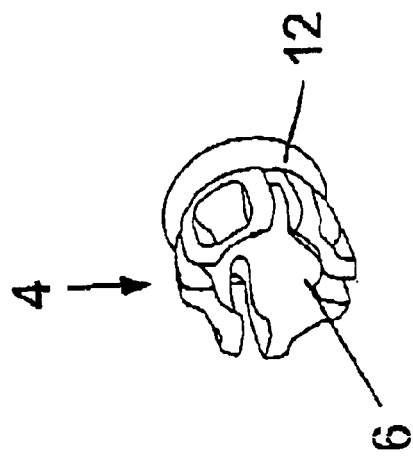
FIG. 5 is a perspective view of a socket as an individual component.
Figure 6:
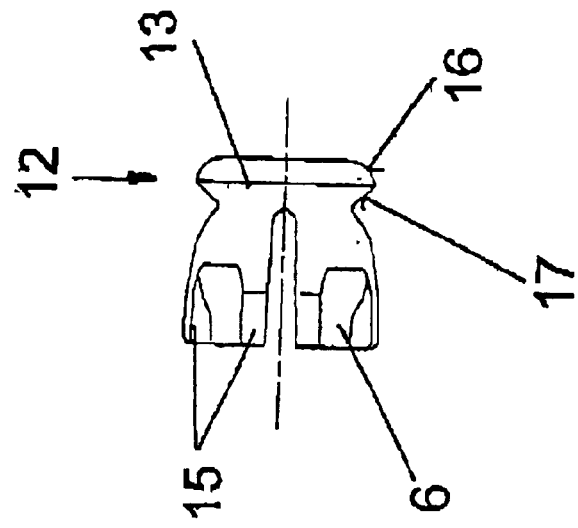
FIG. 6 is a side view of the socket from FIG. 5.
Figure 7:
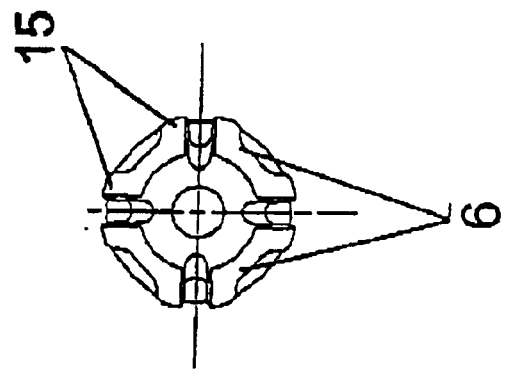
FIG. 7 is a front view of the socket from FIG. 6.

Referring to FIG. 1, there is shown a headlight 50 for motor vehicles that has an optical element 1 formed of a dish-shaped reflector. The optical element 1 is joined to a support element 2 by a ball-and-socket joint 3 and an adjusting device 18 and two additional ball-and-socket joints that are not shown. The optical element 1 can be adjusted by the adjusting device 18 about a pivot axis defined by the ball-and-socket joints.

The support element 2 is a housing, which can be made of, for example, plastic, and whose front side is covered by a light-permeable end window 19. The adjusting device 18 has an adjusting screw 20 that extends in the direction of light output and works together with a linkage 51 located on the support element 2. A threaded section 52 of the end section of the adjusting screw 20, facing in the direction of light output, engages with a threaded bore 53 in a plastic guide part 21 that is radially held and axially movable in a guide (not shown) of the support element 2.

On a free end of a projection pointing in the direction of light output, the guide part 21 has a ball 5, which forms part of the ball-and-socket joint 3. The ball 5 and a socket 4, which is snapped onto the ball 5, is inserted in a receptacle 7. Molded on its circumferential side wall, the receptacle 7 has a mounting projection 22 that is fastened to the optical element 1 by, example, a threaded connection 23.

The socket 4 has a base 12, which includes a circular disk, on one side of which are molded four socket segments 6 that are radially elastic, tongue-shaped and thin-walled in design. After being snapped onto the ball 5, the socket segments 6 contact the outer surface of the ball 5 with preloading and each of the socket segments 6 have two projections 15 on the outside of their end sections facing in the direction in which they are snapped on. One projection 15 is located on each neighboring side of the socket segments 6. The projections 15 of the socket segments 6 contact the cylindrical inner surface of the receptacle 7 in a free edge region 24. In this way, the ball 5 is held in the socket 4 after insertion of the socket 4 into the receptacle 7.

The outside of the base 12 of the socket 4 contacts a bottom 8 of the receptacle 7. Three detent elements 9 that are molded on the receptacle 7, and which are comprised of detent tabs, hold the base 12 of the socket 4 onto the bottom 8 of the receptacle 7 with no play. Each of the detent elements 9 is molded on an edge of an opening 10 in the circumferential side wall of the receptacle 7 facing in the direction of light output. The end section 11 of the detent elements 9 faces the bottom 8 and a circumferential, radially outward projecting edge section 13 of the base 12. The end faces of the end sections 11 of the detent elements 9 make areal contact with a circumferential contact chamfer 17 of the base 12.

The openings 10 of the receptacle 7 that accommodate the detent elements 9 extend from the circumferential side wall of the receptacle 7 to a central region of the bottom 8. In this way the central region of the bottom 8 is elastically resilient in the axial direction, and play-free retention of the socket 4 in the receptacle 7 is assured even with coarse tolerances. The circumferential edge of the side of the base 12 facing the bottom 8 has a radius 16. As a result, the socket 4 orients itself with its center axis along the longitudinal axis of the receptacle 7 on the inward facing end sections of the detent elements, even when the socket 4 is inserted into the receptacle 7 at an angle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for motor vehicles, comprising:
an optical element;
a support element; and
at least one ball-and-socket joint that connects the optical element to the support element and has a spherical ball and a spherical socket,
wherein the socket encloses the ball with socket segments and is inserted into a receptacle together with the ball and contacts the inside of the receptacle with its socket segments,
wherein the socket has a base that contacts the bottom of the receptacle and on its other side has freestanding elastic socket segments that enclose the ball, and
wherein elastic detent elements of the receptacle engage the base of the socket and retain the socket axially in the receptacle.

2. The headlight according to claim 1, wherein the elastic detent elements are comprised of detent tabs, which are each molded on an edge of an opening in the circumferential side wall of the receptacle and point with their free end section to the bottom of the receptacle and radially inward.

3. The headlight according to claim 1, wherein the elastic detent elements contact a circumferential edge section of the base that is freestanding in the radially outward direction and hold the base against the bottom of the receptacle.

4. The headlight according to claim 2, wherein the opening for the detent elements extends from the circumferential side wall of the receptacle toward the central region of the bottom.

5. The headlight according to claim 1, wherein a central region of the bottom of the receptacle has, on the side facing the base, a raised area that serves as a stop for the base.

6. The headlight according to claim 2, wherein the socket on the inside of the receptacle elastically contacts the inside of the receptacle between the openings for the elastic detent elements and the free edge of the receptacle and holds the ball in its desired position by the freestanding radially elastic socket segments.

7. The headlight according to claim 6, wherein the elastic socket segments have, on their edge section pointing opposite the direction of insertion, at least one projection with which they contact the inside of the receptacle.

8. The headlight according to claim 7, wherein the elastic socket segments have, on each of the neighboring sides of their free edge sections, one projection.

9. The headlight according to claim 1, wherein the base of the socket is a circular disk whose outer edge section has a radius on the circumferential edge facing the bottom of the receptacle.

10. The headlight according to claim 1, wherein the base of the socket is a circular disk whose outer edge section has a circumferential contact chamfer for the elastic detent elements on the edge facing away from the bottom of the receptacle.

11. A headlight for a motor vehicle, the headlight comprising:
   a support element having an adjusting device and a guide element being fixedly attached to the support element, the guide element having a ball;
   a socket for receiving the ball of the guide element, the socket having flexible socket segments extending from a base portion of the socket such that the flexible socket segments encompass a portion of the ball of the guide element so that the ball is rotatably secured within the socket, the base portion of the socket includes a chamfer contact area that extends circumferentially about the base portion of the socket;
   a receptacle being fixedly secured to an optical element, the receptacle having a receiving aperture formed therein for receiving the socket, the receptacle further including bendable detent tabs that extend into the receiving aperture and fixedly secure the socket within the receiving aperture by engaging an end portion of the detent tabs with the chamfer contact area of the base portion of the socket.

12. The headlight according to claim 11, wherein, when the adjustment device is operated, a position of the optical element changes and the receptacle and socket is adapted to rotate about the ball of the guide element.

13. The headlight according to claim 11, wherein the receiving aperture of the receptacle is adapted to encompass the socket therein.

14. The headlight according to claim 11, wherein the receiving aperture has a base wall, which forms a portion of a housing of the receptacle, the base wall being adapted to contact the base portion of the socket.

15. The headlight according to claim 11, wherein the receiving aperture of the receptacle is formed to be substantially cylindrical.

* * * * *